United States Patent
Slanina

(10) Patent No.: US 10,979,995 B2
(45) Date of Patent: Apr. 13, 2021

(54) DIRECTION-BASED INTERFACE SELECTION METHOD

(71) Applicant: Atos Convergence Creators GmbH, Vienna (AT)

(72) Inventor: Peter Slanina, Judenau (AT)

(73) Assignee: Atos Convergence Creators GmbH, Vienna (AT)

( * ) Notice: Subject to any disclaimer, the term of this patent is extended or adjusted under 35 U.S.C. 154(b) by 24 days.

(21) Appl. No.: 16/494,597

(22) PCT Filed: Mar. 8, 2018

(86) PCT No.: PCT/EP2018/055789
§ 371 (c)(1),
(2) Date: Sep. 16, 2019

(87) PCT Pub. No.: WO2018/166891
PCT Pub. Date: Sep. 20, 2018

(65) Prior Publication Data
US 2020/0053692 A1      Feb. 13, 2020

(30) Foreign Application Priority Data

Mar. 15, 2017    (EP) .................................... 17161016

(51) Int. Cl.
*H04W 64/00*     (2009.01)
*H04W 76/10*     (2018.01)
*H04B 7/0404*    (2017.01)

(52) U.S. Cl.
CPC ........ *H04W 64/006* (2013.01); *H04B 7/0404* (2013.01); *H04W 76/10* (2018.02)

(58) Field of Classification Search
CPC ............ H04L 37/0491; H04W 64/006; H04W 76/10; H04W 64/00; H04B 7/0404
See application file for complete search history.

(56) References Cited

U.S. PATENT DOCUMENTS

| | | | |
|---|---|---|---|
| 2002/0022909 A1* | 2/2002 | Karem | G05D 1/0094 701/3 |
| 2008/0122716 A1 | 5/2008 | Berg et al. | |

(Continued)

FOREIGN PATENT DOCUMENTS

GB        2 448 510 A      10/2008

OTHER PUBLICATIONS

International Search Report for PCT/EP2018/055789 dated, May 9, 2018 (PCT/ISA/210).

*Primary Examiner* — Syed Ali
(74) *Attorney, Agent, or Firm* — Sughrue Mion, PLLC

(57) ABSTRACT

The invention relates to a direction-based interface selection method, carried out by a communication control module (8) in a vehicle (1), for establishing and retaining a wireless high-frequency communication connection between a communication interface of a moving vehicle (1) and a communication interface of at least one counterpart station. In this case, position data and an orientation of the vehicle with respect to a global coordinate system are determined. A position data record is determined by at least one counterpart station and the position data (12) contained therein are extracted. A direction vector (13) from the vehicle (1) to the counterpart station is then determined and an assignment to a sectoral radiation characteristic of a transmission apparatus is determined for said vector. This transmission apparatus is then connected to a communication device (7) via a communication position switch (6).

4 Claims, 3 Drawing Sheets

(56) References Cited

U.S. PATENT DOCUMENTS

| | | | |
|---|---|---|---|
| 2015/0031352 A1* | 1/2015 | Yi | G01C 21/3605 |
| | | | 455/420 |
| 2015/0229382 A1 | 8/2015 | Lee et al. | |
| 2015/0307118 A1* | 10/2015 | Noffsinger | B60M 1/30 |
| | | | 701/19 |
| 2016/0355198 A1* | 12/2016 | Dulmage | B61L 3/008 |
| 2017/0039764 A1* | 2/2017 | Hu | G06T 17/05 |
| 2017/0129511 A1* | 5/2017 | Crane | B61L 27/0094 |
| 2017/0240061 A1* | 8/2017 | Waters | H02J 50/80 |
| 2018/0198541 A1* | 7/2018 | Harris | H04W 4/80 |
| 2020/0189632 A1* | 6/2020 | Saxena | B61L 3/006 |

\* cited by examiner

DIRECTION-BASED INTERFACE SELECTION METHOD

CROSS REFERENCE TO RELATED APPLICATIONS

This application is a National Stage of International Application No. PCT/EP2018/055789 filed Mar. 8, 2018, claiming priority based on European Patent Application No. 17161016.5, filed Mar. 15, 2017.

The invention relates to a direction-based interface selection method.

In ship or air transport, due to the usually unrestricted propagation of radio waves it is normally possible to communicate over large distances. This is advantageous for providing coverage of large areas, however, due to the propagation time associated with the distance the risk of interference increases, so that the theoretically possible communication distances cannot be achieved. The resulting interference in the case of digital communication lead to a limitation of the bandwidth that can be transmitted via a communication channel. This could be compensated by selecting specific transmission protocols or by increasing the bandwidth of the communication channel, however the available bandwidth is limited due to international regulations. One way to reduce the susceptibility to interference is to improve the spectral efficiency of the radio transmission technology, which has led to the currently most advanced and efficient transmission standard LTE.

These advanced transmission standards, however, are specifically designed for the communication situation in rather small-scale radio cells, in particular, specifically for urban areas. In large-scale radio cells, such as occur in shipping or aviation, for example, these communication systems still offer an optimal data transmission over an available radio channel, but these communication systems are not optimized specifically to handle interference problems.

With regard to the radio equipment of ships or aircraft, it is known that these usually use omni-directional antennas to ensure that a radio connection to the remote station can always be established and maintained regardless of the direction of movement of the vehicle. These omni-directional antennas have the advantage that they are usually very simple in design and have very low requirements in terms of their correct alignment. The disadvantage, however, lies in the fact that they radiate in all directions (or in a hemisphere around the antenna on a vehicle) and primarily receive from the same directions. For example, this may lead to the adverse situation that on receiving a signal from a desired remote station, in particular if the signal is already very weak due to the communication distance, this signal is disturbed by a stronger inbound signal from any arbitrary direction. Due to the limited number of available transmission frequencies, transmission frequencies are reused by transmission stations (base stations) at regular intervals. The distances are selected, based on network planning and/or in accordance with regulatory requirements, in such a way that mutual interference can be excluded as far as possible. However, for sea-going vehicles the situation can occur that land-based base stations, which should actually only radiate as far as the coast, clearly radiate over the open water and, due to favorable propagation conditions, achieve a considerable range there. In particular, due to atmospheric effects (similar to a mirage on land), significant overshooting of the supply or coverage area can sometimes be achieved.

For a water-borne vehicle which is moving in the coastal area then, it is thus very likely that it will enter an area where a base station on land uses the same frequency as is used by the communication system of the vessel.

Of course, the reverse situation is also possible, that at sea the same transmission frequency of a base station on land is used, and thus a moving vessel travels into the coverage range of a base station, where it causes interference.

From the prior art it is known to design complex antenna arrays, in order to achieve interference reduction or compensation. In water-borne vehicles or aircraft, on the one hand, the space required to arrange such an antennas array is usually not available, and in addition, safety regulations means that the arrangement and, above all, the wiring of a complex antenna array is very time-consuming and therefore very expensive.

The object of the invention is then to create a system and/or a method for water-borne vehicles and aircraft in order to achieve an improvement in the quality of a long-range communication using simple components. Particular attention is paid to optimizing the method and/or apparatus to the specific requirements existing in shipping or aviation.

The object of the invention is achieved by a direction-based interface selection method, which is implemented by a communication control module of the vehicle. The method is used for establishing and retaining a wireless high-frequency communication link between a communication interface of a moving vehicle and a communication interface of at least one remote station. The communication interface of the vehicle has at least two transmission devices, which transmission devices each have a sectoral radiation characteristic, and in addition, the transmission devices are connected to a communication device via a communication path switch. The method comprises the following steps.

determining the position data and the orientation of the vehicle in relation to a global coordinate system;

determining location data from at least one remote station;

extracting the position data from the location data and determining the position of the remote station in the global coordinate system;

determining a direction vector from the vehicle to the remote position;

determining an assignment of the direction vector to a sector or to a radiation characteristic;

controlling a communication path switch and connecting the communication device to the transmission device, to which the determined sector and/or the determined radiation characteristic is assigned;

enabling the transmission device and establishing a communication link to the remote station and activating a communication protocol.

This design ensures that the transmission device selected for the communication link is the one whose radiation characteristic is aligned in the direction of the remote station. By means of this sectoral constraint, all other stations are hidden and therefore cannot cause any communication interference. In particular, interference effects are minimized as much as possible. Thus, a stable, interference-free or low-interference communication link is ensured.

A communication path switch is understood herein to mean connecting one of the transmission devices to the communication device. This can be carried out in the RF range, for example, by the transmission device of the RF unit being enabled or disabled. It is equally possible, however, that this communication path switch is formed by an IP router, and therefore the data stream is selectively forwarded from the communication device to a transmission device.

Preferably, those transmission devices that are not connected to the communication device will disable their RF unit.

The activation of a transmission device should be understood in the same sense, which as previously described, can consist of the RF unit being enabled or disabled. As a result, an emission of a high-frequency signal either occurs or not. Due to the technical properties of the transmission device, a selective enabling/disabling of the RF unit may not be possible, in which case, for example, the supply voltage, and thus the transmission device, could also be switched on or off. Or else, the data stream to the transmission device is merely interrupted, the transmission device (including HF unit) remaining active.

An extension consists in the fact that in the case of an active communication link, on a cyclical basis the direction vector is determined and the correspondence between the active assignment of the direction vector to a sector or to a radiation characteristic is tested. As the vehicle and/or the remote station or remote stations can move, it can happen that the transmission device selected when setting up the communication link is no longer optimal due to the assignment of the direction vector to a sector or to a radiation characteristic. For example, the orientation of the vehicle and remote station to each other may have changed to such an extent that the remote station will imminently move out of the radiation characteristic of the selected transmission device. With this extension, this is detected by the cyclical reconstruction of the direction vector, so that it is possible to respond to it accordingly.

According to one extension it is provided that in the event of loss of the assignment
  the assignment of the direction vector to a sector or to a radiation characteristic is determined again;
  the active transmission device is disabled;
  the communication path switch is reconfigured, and the communication device is connected to the transmission device to which the newly determined sector or the determined radiation characteristic is assigned;
  enabling the transmission device and establishing the communication link to the remote station.

This extension ensures an automatic transfer or reassignment of the communication link to another transmission device, without a manually initiated action being required.

In this connection, one extension consists of the fact that the change of the active transmission device is performed without interruption of the active communication link. In most cases, the radiation characteristics of the transmission devices slightly overlap in the peripheral areas. Exiting the radiation characteristic of the transmission device selected when setting up the communication device can thus be detected promptly and allows switching over to another (adjacent) transmission device, without the need to interrupt the existing communication link. For the user or the data service using the communication link, this has the particular advantage that a stable communication link exists.

According to an extension, it is also provided that by means of a receiving device of the vehicle, the position data of the vehicle are received from a global satellite navigation system. Vehicles often have a device for receiving satellite navigation signals and for extracting position data from the received signal packets. This position data can now be used in an advantageous way to specify the position of one's own vehicle in the determination of the direction vector. In an advantageous way, the method according to the invention can access existing systems and no additional time-consuming and costly installation is required.

One extension consists of the fact that by an automated identification system of the vehicle and/or the remote station, location data are emitted on a cyclic basis, preferably as message packages, and are received by a receiving device of the vehicle. Due to international agreements on secure shipping traffic (SOLAS), every major ship must have an Automatic Identification System (AIS) on board. In the aviation sector the equivalent system is ADS-B. This extension has the advantage that the method according to the invention can access identification data, which due to its security-relevant significance, has a high degree of accuracy and, above all, is always kept up-to-date. Depending on the applicable security class, in AIS the update rate is in the range from 2 seconds to 3 minutes.

According to one extension it is provided that an identification identifier is extracted from the received location data and stored in a database of the communication controller module as a vehicle identifier and/or remote station identifier. According to international rules, each vehicle (vessel or aircraft) carries a unique identifier. In a further extension the currently received position data are stored in the database. This makes it possible to enable the corresponding transmission device without a prior exchange of communication parameters or exchange of identifiers and to set up a communication link to a specific remote station, since the required parameters can be read out of the database.

For a company or an organization it is usually only of importance that a reliable communication link exists between its own vehicles. According to one extension, therefore, it is provided that a group identifier code is assigned to a selection of stored remote station identifiers and stored. This extension allows all remote stations which belong, for example, to a company's vehicle fleet to be grouped together or identified. The remote station ID can be, for example, a unique vehicle name or a unique vehicle registration number, the object identifier can also be formed by an identifier of the communication network or the transmission device, so that only the transmission devices that have the corresponding identifier can connect to the communication network. The important point, however, is that an identifier does not need to be transmitted over the communication link, since these are stored.

To this end, one extension is characterized in that the direction vector is only determined for those remote stations for which a group identifier is stored in the database. This extension can be used to reduce considerably the number of remote stations to be considered, since remote stations with an identifier for which no group identifier is stored are ignored.

In addition to a communication with mobile remote stations, it can be stipulated that a communication link to fixed base stations should also be set up. One extension therefore consists in the fact that position data of at least one fixed remote station are stored in the database. If a communication link is to be set up to a base station, the corresponding transmission device can be determined and enabled immediately, because the direction vector can be determined directly based on the knowledge of the position of the base station.

In a desired communication with a remote station, the communication link, in particular the radio link, is also influenced by sources of interference. Sources of interference are understood herein as other transmission stations, in particular other base stations operating on the same frequency, as that used for the RF communication link itself. As already stated above, due to the movement of the vehicle it is possible that this enters the coverage range of a base station device that is using the same transmission frequency. In addition to these kinds of active sources of interference, passive interference sources can also be present, which impede or adversely affect the propagation of the outbound RF communications link from the vehicle's own transmission device. Since the specific RF communications link uses frequencies which require a quasi-line-of-sight connection between transmitter and receiver, objects in the propagation path can adversely affect the communication. Such objects can cause disruption to the propagation due to their mass, material properties and/or spatial extent. According to one extension it is therefore provided that position data of at least one fixed interference source are stored in the database and that—in the determination of the direction vector an interference vector from the vehicle to the stationary remote station is additionally formed. This consideration relates in particular only to the situation in the vehicle's own network. Here, in general, all stations of the other communication networks are regarded in principle as potential sources of interference. For these other stations, the same consideration applies in reverse, except that here the transmitter of the (own) vehicle can become a source of interference. A remote station classified as a source of interference for the vessel's own network can and will form a/the desired transmission station in the foreign network. Since each LTE/WiMAX or WiFi device has a transmitter and a receiver, the mutual dependencies are extremely complex. The interference source, for example, can be a fixed base station, but it can also be a mobile station, such as a vehicle of another communication network. With this extension it is thus also possible to take the mutual dependencies into account and thus enable the operation of a plurality of partially overlapping communication networks, allowing a mutual interference to be reduced. The interference vector can be input into the assignment of the direction vector to the radiation characteristic, so that the transmission device for which the remote station is located within the radiation characteristic is enabled and any interference caused by the interference source is reduced/minimized, and/or the interference due to the transmitter of the vehicle on the receiver of the interference source is reduced/minimized.

An advantageous extension also consists in the fact that the location data are received by means of a receiving device of the at least one remote station. In accordance with international agreements, ships and aircraft are obliged to provide significant characteristics affecting their position and movement automatically to all other traffic participants. In the standard AIS system for shipping, these location data include position (LAT, LON), course (COG), speed (SOG), time (UTC) and heading.

In addition to moving vehicles, a communication connection to fixed remote stations may also need to be set up. It is therefore provided that the location data are stored in the communication control module, in particular, in a database. Stationary remote stations can be, for example, base stations, but they can also be known (stationary) interfering stations. These can be stations that interfere with their own internal communication, but also those which must not be disrupted by the vehicle's own communications.

During the motion of a vehicle, the situation will arise that the assignment of the direction vector to a sector or to a radiation characteristic will change to a neighboring or adjacent sector. In order to be able to guarantee an uninterrupted transition, in accordance with one extension it is provided that the communication path switch connects the communication device to two transmission devices, both of which transmission devices have an overlapping sectoral radiation characteristic. Since the radiation characteristic does not have a sharp demarcation, at a sector boundary the radiation characteristics of two transmission devices will overlap.

The object of the invention is also achieved by a vehicle, in particular a sea-going vessel or aircraft. This vehicle comprises a wireless high-frequency communication interface, and a communication device connected thereto.

The high-frequency communication interface has at least two transmission devices, which transmission devices each have a sectoral radiation characteristic, which radiation characteristic corresponds to a sub-region of the space around the vehicle.

In addition, each transmission device is connected via a communication path switch to the communication device, and the communication path switch is connected to a communication control module, which is designed to selectively connect the communication device to a transmission device by means of the communication path switch.

Also provided is a receiving device connected to the communication control module, which is designed to receive message packets of an automated identification system.

The communication control module has an evaluation module, which forms a selection value from position data of the vehicle and from position data which were extracted from received message packets.

Based on the selection value, the communication path switch specifies a communication path between the communication device and one of the transmission devices.

One extension consists of each transmission device having a high-frequency unit and an antenna. This has the advantage that the wiring outlay is reduced significantly. Transmission of high-frequency (unbalanced) signals over longer cable lengths is disadvantageous, because due to the inevitable cable attenuation, part of the useful signal is lost. In addition, laying such RF cables in water-borne vehicles or aircraft is particularly time-consuming and therefore expensive. Since according to the claims each device has an RF unit, the communication signals can be transmitted from the communication device to the transmission device in the baseband using simple cable systems with low loss. An RF unit is understood to mean, essentially and not exhaustively, a modulator and an RF amplifier with antenna matching.

In a further advantageous extension, each transmission device also has a receiving device. Since a communication link can be bidirectional, it is advantageous if the transmission device also has a receiving device, which preferably also has a sectoral reception characteristic. The radiation and reception characteristics are preferably matching.

One extension also consists in that the high-frequency communication interface has four transmission devices, the radiation characteristic of each transmission device covering an azimuthal sub-range between 85° and 100°, in particular between 90° and 95°. This extension guarantees that the entire azimuthal range around the vehicle is covered by the transmission devices, wherein each transmission device covers only a subsection and therefore does not capture possible interference from other sectors, or due to the radiation characteristic, cannot capture it.

One extension consists in that an automated identification system, which is designed for the cyclical transmission of identification message packets, is present on the vehicle. In the case of water-borne vehicles this is preferably an AIS, which is subject to the regulations and requirements of SOLAS. For aircraft this is ADS-B. The particular advantage of these systems lies in the fact that there is an international, or very widespread, standard for them and this is actually used. In addition, these systems provide some security for shipping or air traffic, so that the broadcast message packets and the positional and movement information encoded therein satisfy high accuracy requirements.

In one extension a receiver for a global satellite navigation system is present on the vehicle, which receiver provides position data of the vehicle. Thus, the method according to the invention can access position data, without the need to provide its own receiver.

Figure 1:
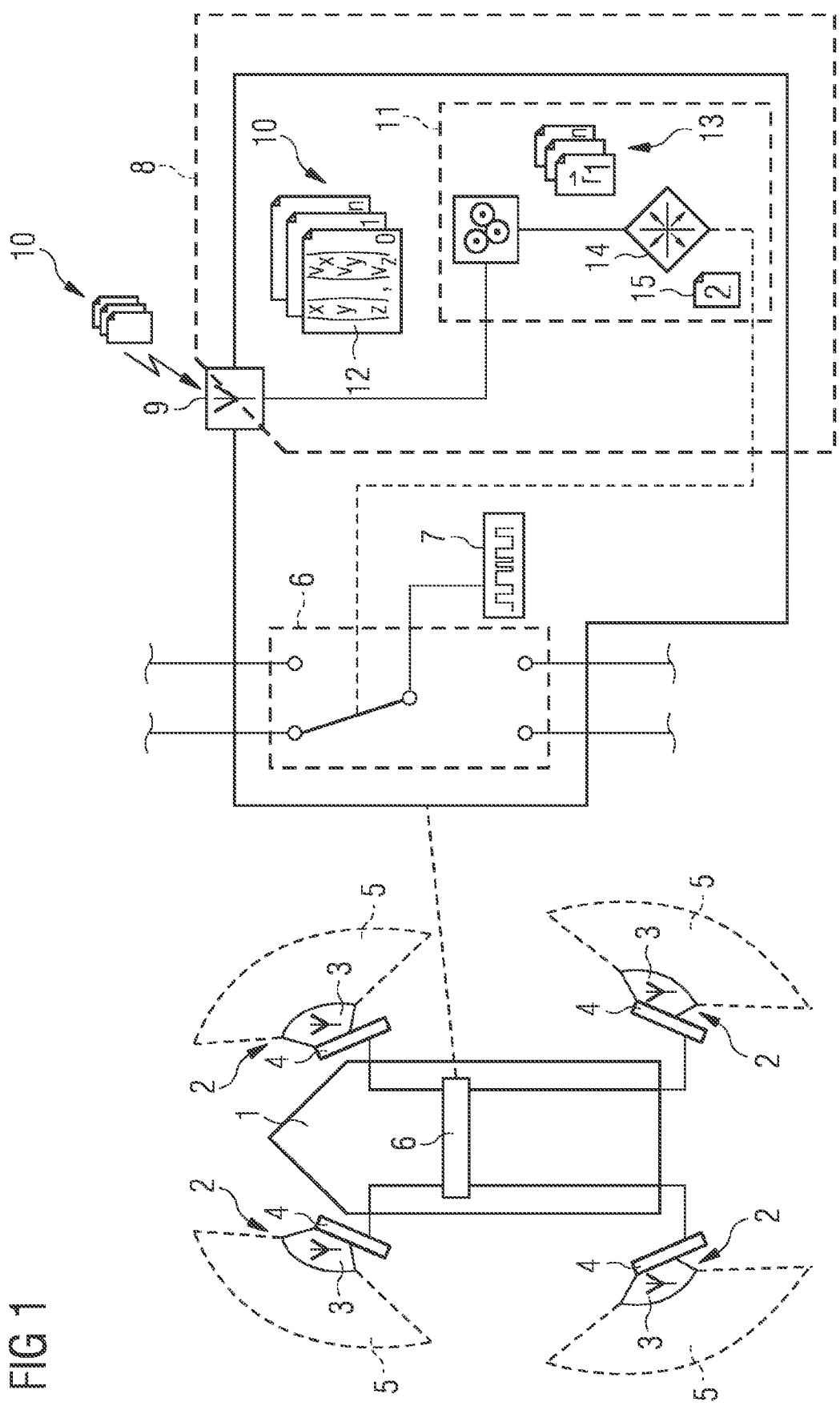
FIG. 1 shows a schematic overview drawing of a vehicle with the components used for and during the implementation of the method of the invention.

FIG. 1 shows a vehicle 1 according to the invention, in particular, for example, a water-borne vehicle, on which the interface selection method of the invention is implemented. The vehicle 1 has a plurality of transmission devices 2, which transmission devices 2 together form a communication interface. The transmission devices 2 each comprise an antenna 3 and a high-frequency unit 4, the antenna 3 having a sectoral radiation characteristic 5 oriented in the azimuthal direction. In total, all radiation characteristics 5 cover the entire azimuthal space around the vehicle 1.

The transmission devices 2 are connected via a communication path switch 6 to a communication device 7. The communication device 7 is, for example and not exclusively, a data terminal of a data processing system or a communication system.

The communication path switch 6 is also connected to a communication control module 8, which by means of the communication path switch 6 selectively connects the communication device 7 to one of the transmission devices 2.

In addition, a receiver device 9 is connected to the communication control module 8 and is designed to receive message packets 10 of an automated identification system from at least one remote station. The receiving device 9 can either be part of the communication control module 8, or else it is a stand-alone receiving device of the vehicle 1. In the figure, this is illustrated by the only partial outline of the receiving device 9.

In addition, the communication control module 8 has an evaluation module 11, which extracts position data 12 from the message packets 10 transmitted and received by the receiving device 9. From the position data 12 of at least one remote station 10, extracted from received message packets, (index 1 to n of the position data), and determined position data (12) of the vehicle 1 (index 0 of the position data), a direction vector 13 is formed. An assignment 14 of the direction vector 13 to a sector or a radiation characteristic is then determined and transmitted as selection value 15 to the communication path switch 6. By the latter, based on the selection value 15, the communication device 7 is then connected to the transmission device 2 corresponding to the selection value 15, as a result of which the communication device 7 establishes a communication link to the remote station via the transmission device, in particular via the RE stage 4 and the antenna 3.

It is noted that the above-mentioned message packets 10 are to be understood as messages of automatic identification systems (AIS) of other vehicles in the surrounding area and, in particular, include an identifier of the vehicle, position data, motion data and a motion status.

For presentational reasons, the details of the communication path switch 6 and the communication control module 8, among other components, are shown separately. However, it is important to understand that these components are associated with the vehicle and, for example, form part of a communication system of the vehicle.

Figure 2:
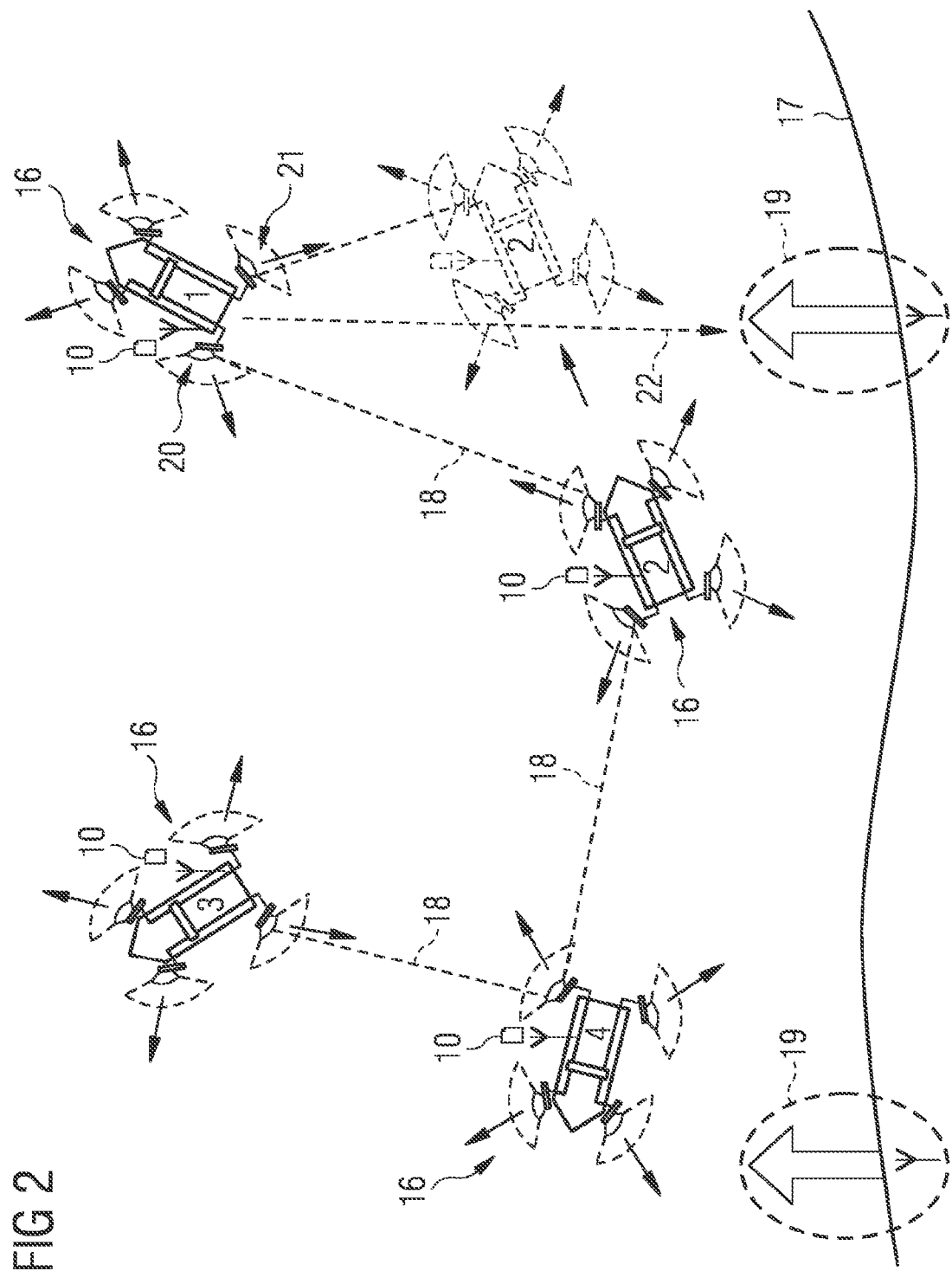
FIG. 2 shows a communication situation which makes use of the method of the invention.

FIG. 2 shows a possible communication situation in shipping. It shows four ships 16, traveling off a coast 17. It is shown that a communication link 18 exists between the ships 3 and 4, between the ships 4 and 2 and between the ships 2 and 1. It should be noted that these communication links 18 can exist at the same time, but do not need to.

On the coast two interference sources 19 are also present, which emit the electromagnetic waves in the direction of the sea. These interference sources 19 are preferably base stations (on land), which use the same transmission frequency as the ship's own RF communication interface.

From each of the ships 16, location data are broadcast as a message package 10 of an automated identification system and received by all other ships 16, and the position and motion data contained therein are analyzed. Thus, each ship, in particular each communication control module, has knowledge of the position, orientation, and movement of the other vessels in the network at any time. For example, if ship 2 moves slightly in the direction of its heading, this is detected by the communication control module on ship 1 and the first transmission device 20 is disabled and the second transmission device 21 is enabled. For ship 2 nothing changes, since both for the communication with ship 1 and for the communication with ship 4 the same transmission device can continue to remain active. Thus an optimum configuration of the transmission devices exists at all times, so that due solely to the selection of the transmission devices according to the method, a large number of possible sources of interference is eliminated.

In addition to determining a direction vector between the vehicle and the remote station, an interference vector 22 can also be determined, which specifies the direction and, in particular, the distance to an interference source 19. Based on this distance information, the communication protocol, in particular the timing and the location of communication breaks, can be adjusted in such a way that reflected signals are eliminated or suppressed as far as possible.

If the exact position of interference sources is not known but they can be assumed to exist, for example, in the coastal region, then e.g. artificial interference sources can be posited and stored in the database with a fixed position. Thus, the communication can be proactively prepared for an expected interference.

FIG. 3 shows potential practical applications of the method according to the invention.

Figure 3B:
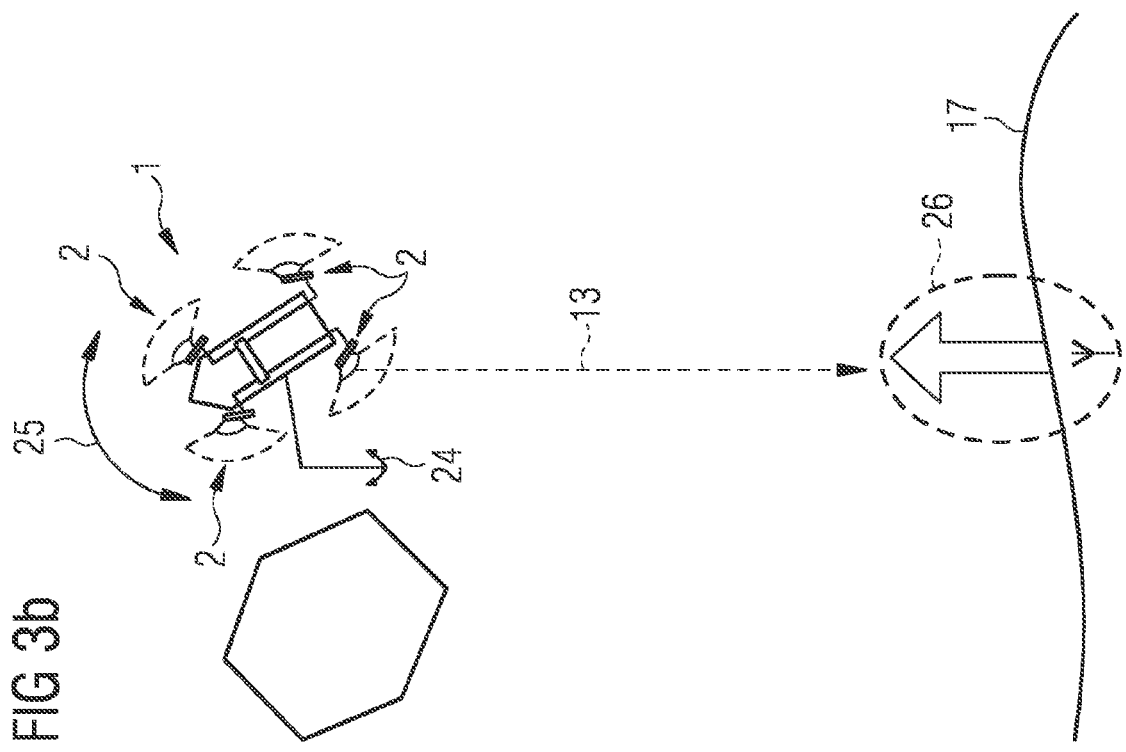
FIGS. 3A and 3B shows additional communication situations making use of the method of the invention.
Figure 3A:
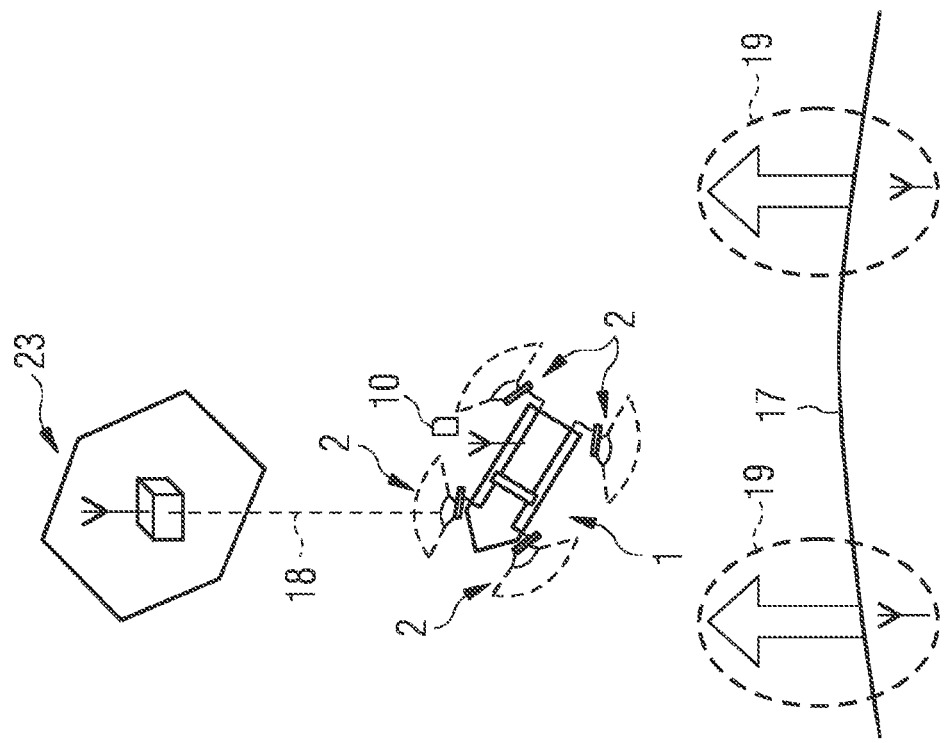

FIG. 3a shows the situation in which a moving vehicle sets up a communication link 18 to a fixed remote station 23. The position and orientation of the vehicle 1 can be obtained, in turn, by received message packets 10 of its own automatic identification system, or else its own position is determined by receiving position information from a global satellite navigation system. Since the remote station 23 is stationary, however, the position data of the remote station 23 can also be stored in the communication control module of the vehicle 1, preferably in a database. However, it is also possible that the remote station 23 has an automated identification system and thus broadcasts location data cyclically as message packets 10, which are received by the receiver of the vehicle 1 and from which the location data of the remote station 23 are extracted. By the formation of the direction vector from the vehicle 1 to the remote station 23 it is possible to determine the particular transmission device 2 whose radiation characteristic is oriented in the direction of the remote station 2. In the case illustrated, it would be the two transmission devices on the right-hand side of the vehicle. Taking into account the respective radiation characteristic, in order to achieve the highest possible communication quality, in the assignment of the direction vector to a sector or a radiation characteristic the optimally oriented transmission device 2 is selected. In FIG. 3*a*, this will be the transmission device 2, ahead of the vehicle 1 to the right.

The choice of this transmission device 2 ensures that no signal component of an interference source 19 can enter the radiation characteristic of the transmission device 2 and therefore interfere with the communication between vehicle 1 and remote station 23.

FIG. 3*b* shows another possible application example, in which a vehicle 1 is anchored 24 at a fixed position off the coast 17. The position of the vehicle 1 in the global coordinate system is therefore very largely fixed, and the minor variations in the position of the vehicle 1 around the anchor position 24 can be neglected in relation to the choice of the transmission device 2. As a result of currents and weather-related effects, however, it is quite possible that the vehicle changes 25 its orientation about the anchor position 24.

Communication stations 26 can then be provided on land 17, which provide a communication service independent of the vehicle 1. Due to regulatory requirements it is usually required that the outgoing communication links from the vehicle do not interfere with the communication service of the communication station 26. This means that, for example, in the case of a communication from the vehicle in the direction of the communication station 26, the vehicle 1 does not use any transmission frequencies of the communication station 26, which would interfere with them. It can also be required that the transmission power in the direction of the communication station 26 must be reduced to a point where it also cannot cause interference with the communication station 26. In particular, it could also be required, for example, that no radio signal is emitted by the vehicle 1 in the direction of the communication station 26.

Likewise, as previously described in FIG. 3*a*, the position of the communication station 26 can be stored in the communication control module of the vehicle 1, or a message packet with location data can be emitted by the communication station 26.

Using the method of the invention, the vehicle 1, due to the knowledge of its own position data and, in particular, its own orientation with respect to the global coordinate system and the knowledge of the position of the communication station 26, can determine a direction vector 13. The transmission device 2 of the vehicle 1 will then be configured accordingly in order to fulfil the requirements.

A further possible application scenario is already illustrated in FIG. 2.

FIG. 2 shows communication links 18 between a plurality of vehicles, in particular between a plurality of ships 16. In addition to a direct communication between two ships, for example, between ship 1 and ship 2, in such a meshed network it is also possible for a communication station to act as a relay. This enables communication between two stations, which could not communicate with each other over a direct path.

For example, a communication might need to be set up between the ships 2 and 3, but wherein a direct connection between these two ships 16 is not possible. For example, there could be a land mass located between them, which prevents a communication link. However, it could also be the case that a strong source of interference exists between the two, which also prevents the establishment of a communication link. The specific communication systems use signal frequencies that have a largely optical propagation characteristic, so that a line-of-sight link must normally exist between the remote stations. The automatic identification system (AIS) used on sea-going vessels in accordance with the regulatory provisions uses a communication frequency in the VHF range, where due to the signal propagation as a sky wave, objects in the direct connection line between two communication stations usually interfere less. Thus, it is possible for the ship 3 to receive the message packets 10 of the automated identification system of ship 2 and therefore knows the latter's position. Since the position of ship 4 is also known, ship 4 can then be enabled as a relay station in order to set up the communication link 18 from ship 3 to ship 4 and onward from ship 4 to ship 2.

This functionality of a meshed network has the particular advantage that it minimizes communication interference as a result of propagation conditions or as a result of interference signals, by setting up an alternative communication path via the intermediate stations that now operate as relays. Of course, it is provided that a plurality of relays can also be arranged in the communication link. In relation to FIG. 2, this could mean that communication between the ships 3 and 1 is routed via the ships 4 and 2 as relays.

The invention claimed is:

1. A vehicle in particular a water-borne vehicle or aircraft, comprising a wireless high-frequency communication interface, and a communication interface connected thereto, characterized in that the high-frequency communication interface has four transmission devices, which transmission devices each have a sectoral radiation characteristic, which radiation characteristic corresponds to a sub-region of the space around the vehicle, the radiation characteristic of each transmission device covering an azimuthal sub-range between 85° and 100°, in particular between 90° and 95°, and in that each transmission device has a high-frequency unit and an antenna, and wherein each transmission device is connected via a communication path switch to the communication device, and in that the communication path switch is connected to a communication control module, which is designed for selectively connecting the communication device to a transmission device by means of the communication path switch, and in that a receiving device connected to the communication control module is provided, which is designed to receive message packets of an automated identification system, and in that the communication control module has an evaluation module, which forms a direction vector from position data of the vehicle and from position data which were extracted from received message packets, and in that the direction vector with based on the selection value, the communication path switch specifies a communication path between the communication device and one of the transmission devices.

2. The vehicle as claimed in claim 1, characterized in that each transmission device also has a receiving device.

3. The vehicle as claimed in claim 1, characterized in that an automated identification system is present on the vehicle, which is designed for the cyclical transmission of identification message packets.

4. The vehicle as claimed claim 1, characterized in that a receiver for a global satellite navigation system is present on the vehicle, which receiver provides position data of the vehicle.

\* \* \* \* \*